US011024300B2

(12) United States Patent
Ban et al.

(10) Patent No.: US 11,024,300 B2
(45) Date of Patent: Jun. 1, 2021

(54) ELECTRONIC DEVICE AND CONTROL METHOD THEREFOR

(71) Applicant: Samsung Electronics Co., Ltd., Suwon-si (KR)

(72) Inventors: Dae-Hyun Ban, Seoul (KR); Woo-Jin Park, Yongin-si (KR); Kyu-Haeng Lee, Seoul (KR); Sang-Soon Lim, Seoul (KR); Seong-Won Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 80 days.

(21) Appl. No.: 16/342,771

(22) PCT Filed: Mar. 9, 2017

(86) PCT No.: PCT/KR2017/002572
§ 371 (c)(1),
(2) Date: Apr. 17, 2019

(87) PCT Pub. No.: WO2018/074681
PCT Pub. Date: Apr. 26, 2018

(65) Prior Publication Data
US 2020/0058298 A1 Feb. 20, 2020

(30) Foreign Application Priority Data
Oct. 18, 2016 (KR) .................. 10-2016-0134882

(51) Int. Cl.
*G10L 15/197* (2013.01)
*G06F 3/023* (2006.01)
(Continued)

(52) U.S. Cl.
CPC .......... *G10L 15/197* (2013.01); *G06F 3/0237* (2013.01); *G06F 3/04886* (2013.01); *H04L 51/02* (2013.01)

(58) Field of Classification Search
CPC ..... G10L 15/197; H04L 51/02; G06F 40/274; G06F 40/284; G06F 40/216; G06F 3/0237; G06F 3/04886; G06N 3/08; G06N 20/00
See application file for complete search history.

(56) References Cited

U.S. PATENT DOCUMENTS 8,868,592 B1 10/2014 Weininger et al.
9,208,779 B2 12/2015 Sak et al.
(Continued)

FOREIGN PATENT DOCUMENTS

KR 10-2009-0015284 A 2/2009
KR 10-2010-0062251 A 6/2010
(Continued)

OTHER PUBLICATIONS

Introducing the world's first neural network keyboard, https://blog.swift.com/neural-networks-a-meaningful-leap-for-mobile-Typing/.
(Continued)

*Primary Examiner* — Yogeshkumar Patel
(74) *Attorney, Agent, or Firm* — Jefferson IP Law, LLP

(57) ABSTRACT

Provided are an electronic device and a control method. The electronic device comprises: a storage unit for storing a user-based dictionary; an input unit for receiving an input sentence including a user-specific word and at least one word learned by a neural network-based language model; and a processor for determining a concept category of the user-specific word on the basis of semantic information of the input sentence, adding the user-specific word to the user-based dictionary to perform update, and when text corresponding to semantic information of the at least one learned word is input, providing the user-specific word as an autocomplete recommendation word which can be input subsequent to the text.

12 Claims, 11 Drawing Sheets

(51) Int. Cl.
*G06F 3/0488* (2013.01)
*H04L 12/58* (2006.01)

(56) References Cited

U.S. PATENT DOCUMENTS

| | | | | |
|---|---|---|---|---|
| 2008/0221878 A1* | 9/2008 | Collobert | ................ | G06F 40/30 704/232 |
| 2014/0278379 A1* | 9/2014 | Coccaro | .............. | G10L 15/1822 704/202 |
| 2015/0073788 A1 | 3/2015 | Sak et al. | | |
| 2015/0347383 A1 | 12/2015 | Willmore et al. | | |
| 2016/0012036 A1* | 1/2016 | Sun | ....................... | G06F 40/242 704/10 |
| 2016/0124970 A1 | 5/2016 | Hwang | | |

FOREIGN PATENT DOCUMENTS

| | | | |
|---|---|---|---|
| KR | 10-2011-0023304 | A | 3/2011 |
| KR | 10-2012-0070782 | A | 7/2012 |
| KR | 10-2013-0045673 | A | 5/2013 |
| KR | 10-1388569 | B1 | 4/2014 |
| KR | 10-2016-0105995 | A | 9/2016 |
| WO | 2011/088053 | A2 | 7/2011 |
| WO | 2016/068455 | A1 | 5/2016 |

OTHER PUBLICATIONS

Microsoft acquires SwiftKey in support of re-inventing productivity ambition, http://blogs.microsoft.com/blog/2016/02/03/microsoft-acquires-swiftkey-in-support-of-re-inventing-productivity-ambition.

Anonymous, How do Neural Networks make better word predictions?, Web Archive image from webpage, Apr. 4, 2016, pp. 1-4, XP055445029 Retrieved from the Internet: URL:http://web.archive.org/web/20160404191 822im /https://d3vvnhml5anvln.cloudfront.net/content/uploads/2015/10/neural-net-info graphic.jpg [retrieved on Jan. 26, 2018].

Oren Melamud et al., Modeling Word Meaning in Context with Substitute Vectors, May 31, 2015, pp. 472-482, XP055621546.

Marco Fiscato et al., Neural Language Modelling, Sep. 29, 2016, XP055457527, Retrieved from the Internet: URL:http://www.bicv.org/deep-learning/ [retrieved on Mar. 8, 2018].

Shaohua Li et al., PSDVec: a Tool box for Incremental and Scalable Word Embedding, vol. 237, Jun. 10, 2016, XP055457387.

Tonio Wandmacher et al., SIBYLLE: A System for Alternative Communication Adapting to the Context and Its User, Oct. 15, 2007, pp. 203-210, XP058301132.

European Search Report dated Sep. 26, 2019, issued in European Patent Application No. 17862695.8.

* cited by examiner

ID
ELECTRONIC DEVICE AND CONTROL METHOD THEREFOR

TECHNICAL FIELD

The disclosure relates to an electronic device and a control method therefor, and more particularly, to an electronic device that provides a user based dictionary using semantic word embedding of user-specific words that are not learned in a neural network-based language model and a control method therefor.

BACKGROUND ART

With the increasing use of Internet on Things (IoT) devices, character input methods more convenient to users are being developed in smart devices.

For example, a smart device is provided with a word automatic completion function and a next word prediction function by using a virtual keyboard.

Generally, the word automatic completion function and the next word prediction function by using the virtual keyboard use an N-gram model or a neural network language model.

The N-gram model may predict a next word to be input considering only the order of input words without considering the semantic meaning of the input words in a learned syntax in a neural network. Therefore, it is easy to add words to the language model of the N-gram model, but the order of words recommended by predicting the next word to be input is semantically inconsistent.

On the other hand, semantic word embedding, which is a method of predicting a next word using a neural network method and recommending an automatic completion word, converts words having similar meaning into similar vector values based on the semantic meaning of the words and places the converted words at positions adjacent to each other on a vector space. Therefore, the order of the automatic completion recommendation words is semantically consistent in the neural network method.

However, semantic word embedding analyzes meaning only for words learned in the neural network language model and is provided as an automatic completion recommendation word. Thus, when a user-specific word that is not included in a conventional neural network language model (e.g., vocabularies included in a dictionary) is input to a user terminal, there is a problem that the user-specific word is not provided as an automatic completion recommendation word even if the user-specific word has a similar meaning to the words learned in the neural network language model.

DISCLOSURE

Technical Problem

The disclosure provides an electronic device for providing a user-based dictionary based on semantic word embedding of a user-specific word used in a user terminal and, when a neural network language model is used, providing the user-specific word as an automatic completion recommendation word to increase accuracy of an input function and a control method therefor.

Technical Solution

According to an aspect of the disclosure, an electronic device for supporting a personalization service includes a storage storing a user-based dictionary; an inputter configured to receive an input of a sentence comprising a user-specific word and at least one word learned by a neural network-based language model; and a processor configured to determine a concept category of the user-specific word based on semantic information of the input sentence when the user-specific word is not included in the neural network-based language model, add the user-specific word to the user-based dictionary to update the user-based dictionary, and when a text corresponding to the semantic information of the at least one learned word is input, provide the user-specific word as an automatic completion recommendation word that is input after the text.

According to another aspect of the disclosure, a control method for supporting a personalization service of an electronic device includes receiving an input of a sentence comprising a user-specific word and at least one word learned by a neural network-based language model; determining a concept category of the user-specific word based on semantic information of the input sentence; adding the user-specific word to the user-based dictionary to update the user-based dictionary; and when a text corresponding to the semantic information of the at least one learned word is input, providing the user-specific word as an automatic completion recommendation word that is input after the text.

Effect of Invention

Based on the above-described embodiments, an electronic device and a control method therefor according to the disclosure may add a user-specific word that is not learned by a neural network language model to a user-based dictionary based on semantic meaning of the user-specific word when the user-specific word is input and update the user-based dictionary, thereby supporting personalization of the electronic device.

Also, based on the user-based dictionary according to the embodiment of the disclosure, the user-specific word may be provided as an automatic input recommendation word, thereby providing expanded input productivity to a user.

Also, an electronic device and a control method therefor according to the disclosure may share a user-based language model between a plurality of electronic devices used by the same user, thereby providing a user with convenient input productivity.

BEST MODE

Figure 1:
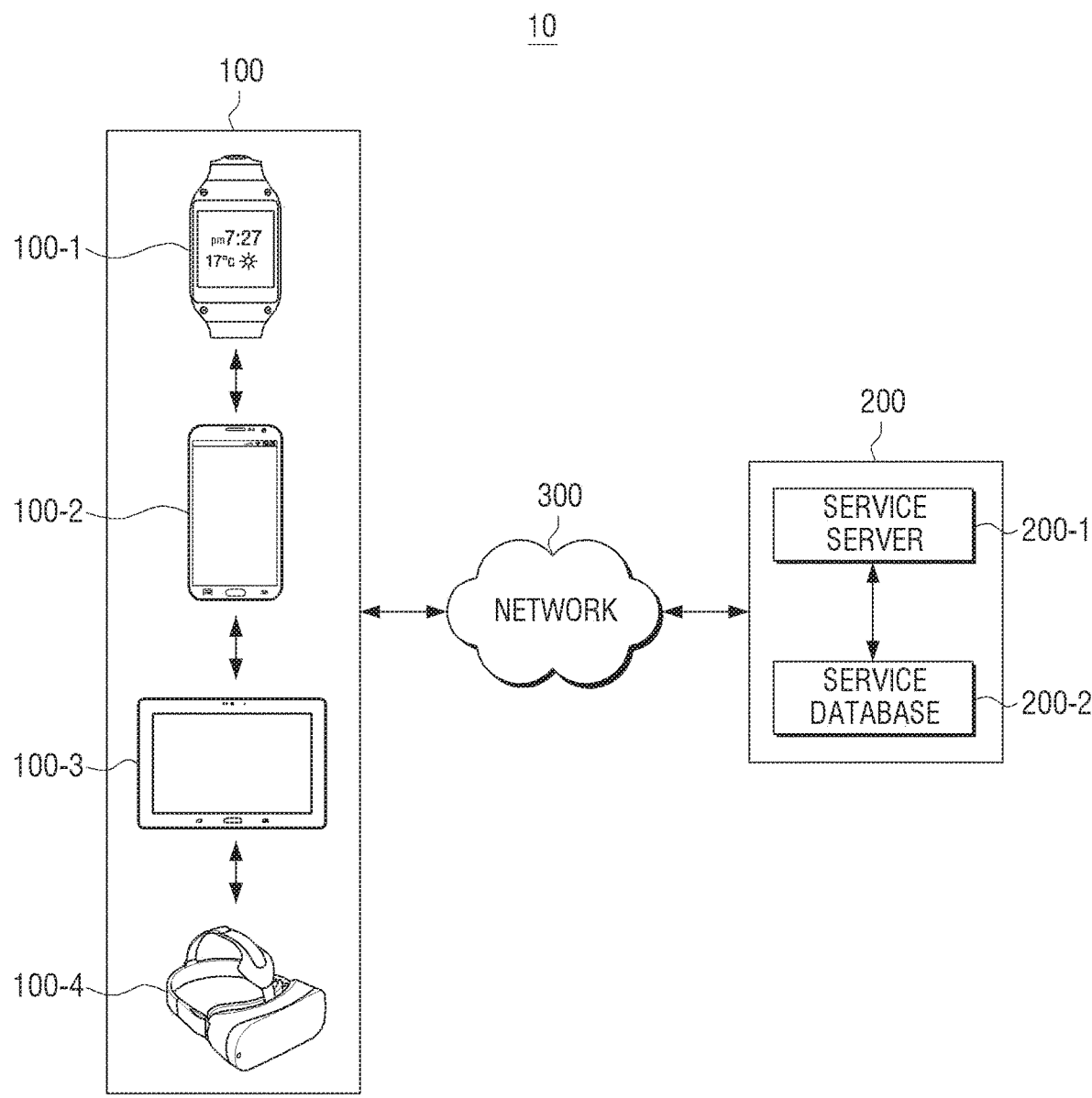
FIG. 1 is a diagram of a system that provides a user-based language model, according to an embodiment of the disclosure.

The terms used in the disclosure will be briefly described, and the disclosure will be described in detail.

In disclosure, the term "module" or "part" may perform at least one function or operation and may be implemented as hardware, software, or a combination of hardware and software. Also, a plurality of "modules" or a plurality of "parts" may be implemented as at least one processor (not shown) integrated into at least one module, except for a "module" or a "part" that is necessarily implemented as specific hardware.

In disclosure, the term "text" may include at least one vocabularies, words, characters, and the like, and may include clauses, sentences, etc. of one or more words.

In the disclosure, the term "word" may be a unit of a semantic concept of at least one of a number, a character, a special character, and an alphabet of each language.

Reference will now be made in detail to embodiments of the disclosure, examples of which are illustrated in the accompanying drawings, wherein like reference numerals refer to the like elements throughout. However, the disclosure may be embodied in many different forms and is not limited to the embodiments described herein. In order that the disclosure may be more fully understood, the same reference numerals are used throughout the present specification to avoid redundancy.

FIG. 1 is a diagram of a system that provides a user-based language model, according to an embodiment of the disclosure.

Referring to FIG. 1, a system 10 may include an electronic device 100, a server 200, and a wired and/or wireless network 300 connecting the electronic device 100 and the server 200.

For example, the electronic device 100 may be a smart device such as a wearable watch 100-1, a smartphone 100-2, a tablet PC 100-3, and a head-mounted display 100-4. The electronic device 100 may remotely control other electronic devices using a wired and/or wireless communication method. The electronic devices 100-1, 100-2, 100-3, and 100-4 may share data with each other using the wired and/or wireless communication method. The above-described examples are merely illustrative of the disclosure, but are not limited thereto.

According to an embodiment of the disclosure, the electronic device 100 may include a user-based dictionary that includes user-specific words that are not learned in a neural network language model. Further, the electronic devices 100-1, 100-2, 100-3, and 100-4 may share the user-based dictionary with each other.

The server 200 may include a service server 200-1 and a service database 200-2. The service server 200-1 may be a server that provides an application service to the electronic device 100. The service database 200-2 may provide neural network (NN) data at the request of the service server 200-1. The service database 200-2 may be included in the service server 200-1 or may be present outside. The service database 200-2 may provide the NN data at the request of the electronic device 100 without passing through the service server 200-1. For example, the service database 200-1 may be a cloud-based server, but is not limited thereto.

The service database 200 may be included in the electronic device 100 and may be separately implemented without being included therein.

In the disclosure, the server 200 will be described as an example of the cloud-based service database 200-2. The server 200 may store a variety of neural network-based language model (LM).

Figure 2:
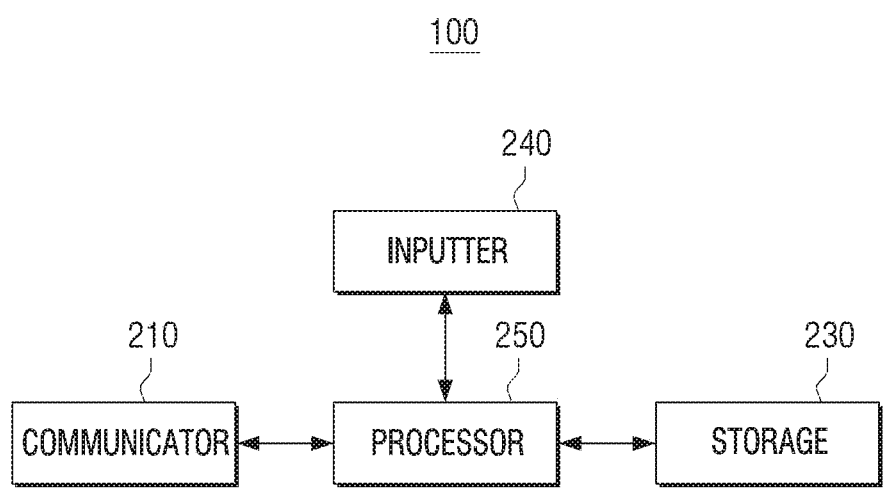
FIG. 2 is a simplified block diagram of an electronic device, according to an embodiment of the disclosure.

FIG. 2 is a simplified block diagram of an electronic device, according to an embodiment of the disclosure.

Referring to FIG. 2, the electronic device 100 includes a communicator 210, a storage 230, an inputter 240, and a processor 250. According to an embodiment, some of the components shown in FIG. 2 may be omitted or changed, and other components may be further added.

The communicator 210 performs communication with various types of external devices according to various types of wired and/or wireless communication methods. Various communication methods are described in detail in FIG. 9.

According to an embodiment of the disclosure, the communicator 210 may communicate with other electronic devices that a user desires to use to share user-based language model information with other electronic devices. Also, the communicator 210 may communicate with a cloud-based server and communicate with a server that provides an application service.

The storage 220 may store various data information of the electronic device 100. The storage 230 may store a user-based dictionary. The user-based dictionary may store user-specific words not learned by a neural network language model. The user-specific words may include at least one character, alphabet, vocabulary, and the like.

The inputter 240 may include a keyboard, a mouse, a pointer, a stylus pen, a microphone for inputting voice commands, and the like that may receive an input of text from the user, but is not limited thereto.

For example, the keyboard may be a virtual keyboard. The virtual keyboard may be implemented on a display of the electronic device 100.

According to an embodiment of the disclosure, the inputter 240 may receive a user-specific word and a sentence including at least one word learned by a neural network-based language model.

The processor 250 may determine (or identify) concept categories of user-specific words included in the sentence input from the inputter 210 based on semantic information of the at least one word learned by neural network language models, and add the user-specific words to the user-based dictionary for each of the determined (or (or identified) concept categories and update the user-based dictionary.

When text corresponding to the semantic information of the learned at least one word is input, the processor 250 may provide a user specific word as an automatic completion recommendation word that may be input after the text.

The processor 250 may provide the user specific word along with at least one word recommended from the neural network-based language model as the automatic completion recommendation word.

The processor 250 may provide an upper number of words having specified priority as the automatic completion recommendation word.

The processor 250 may transmit the user-specific word to the neural network as an input value and project the user-specific word onto a space vector of the neural network-based language model corresponding to the determined concept category.

The space vector may be a concept category space in which at least one word recommended as an automatic completion word to be input in the neural network language model is located.

The processor 250 may determine (or identify) a cosine similarity between a vector of the user-specific word and a vector of the recommended at least one word, and when the determined (or identified) similarity is greater than or equal to a specified value, determine a concept category including the recommended at least one word as a concept category of the user-specific word.

The processor 250 may provide the user-specific word as the automatic completion recommendation word when a priority of the user-specific word is included in a specified upper priority based on the determined similarity.

The processor 250 may provide user-based dictionary information to another terminal device in response to a signal requesting the user-based language model information from the other terminal device by the communicator 210.

The processor 250 may provide the user-based dictionary information to the other terminal device authenticated from the electronic device 100.

The processor 250 may delete the user-specific word from the user-based dictionary when a frequency of use of the user-specific word is less than or equal to a specified number of times during a specified period of time.

Figure 3:
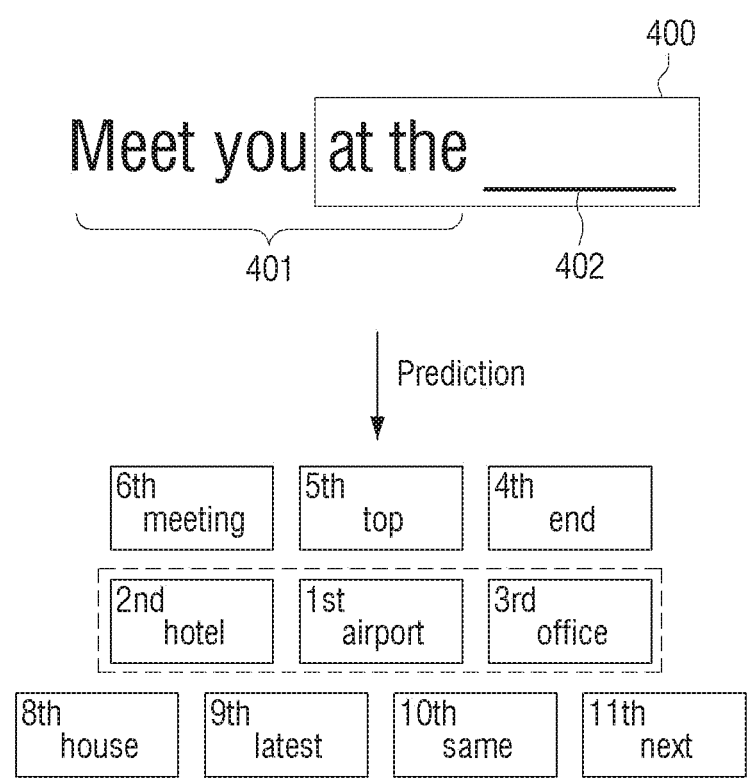
FIG. 3 is a diagram for explaining a method of predicting an automatic completion word to be input in a conventional neural network language model, according to an embodiment of the disclosure.

FIG. 3 is a diagram for explaining a method of predicting an automatic completion word to be input in a conventional neural network language model, according to an embodiment of the disclosure.

The conventional neural network based language model may predict an automatic input word by semantic word embedding.

Referring to FIG. 3, for example, when a sentence input in the electronic device 100 is "Meet you at the 401", the neural network language model analyzes the meaning of "Meet you at the 401". When it is determined that "at the _" indicates a "place" based on a frequency of use of the sentence "at the _ 400" input by a user from the electronic device 100 and the meaning of the used sentence, the neural network may predict and provide "airport", "hotel", "office", and the like indicating the place to the device 100 using an automatic input word 402.

Generally, the neural network may predict an automatic completion word according to a vector cosine similarity of words having similar meaning by using a semantic word embedding algorithm in the neural network.

That is, in a neural network based semantic word embedding method, it may be seen that the meaning (e.g., a place) of recommended high priority words (airport, hotel, and office) is similar.

However, in the neural network based semantic word embedding algorithm, only words learned in the neural network-based language model may be predicted as the automatic completion word and provided to the electronic device 100. Therefore, a user-specific word based on a user terminal that is not learned by the neural network language model is not recommended as the automatic input word 402 even if the user-specific word is frequently input to the electronic device 100.

Figure 4A:
FIGS. 4A and 4B are diagrams for explaining a method of recommending an automatic completion word to be input by a conventional N-gram algorithm.
Figure 4B:
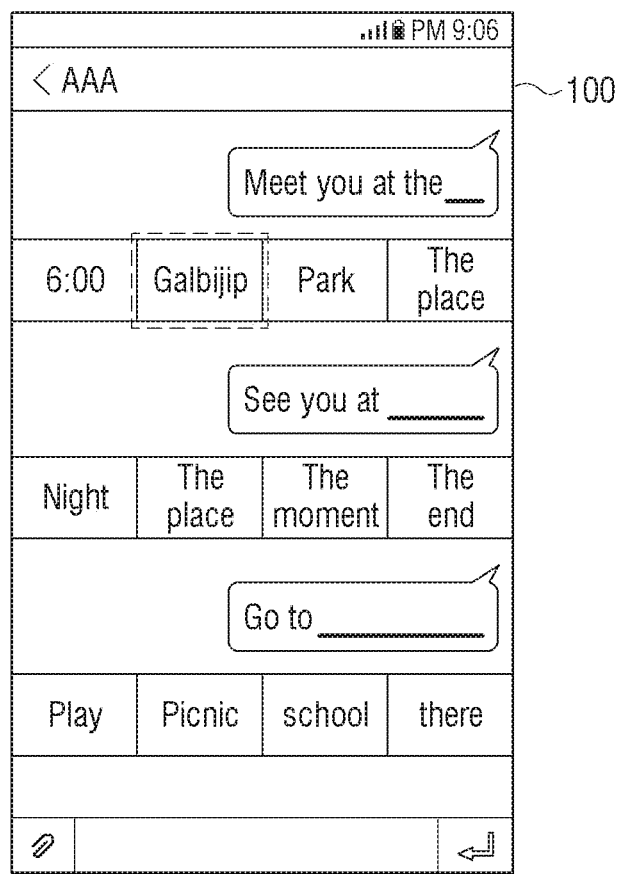

FIGS. 4A and 4B are diagrams for explaining a method of recommending an automatic completion word to be input by a conventional N-gram algorithm.

FIG. 4A is a diagram showing that the electronic device 100 receives a sentence including a user-specific word not learned in a conventional language model.

Referring to FIG. 4A, the electronic device 100 receives "Galbijip" a other than "hotel", "office", and "airport" which are words recommended in a neural network-based or N-gram-based language model from a user after "Meet you at the". At this time, when "Galbijip" is not stored in the neural network language model, then the electronic device 100 may not provide "Galbijip" as an automatic completion recommendation word when a word having a similar semantic meaning such as "Meet you at" or "Meet you at the" is input next.

FIG. 4B is a diagram illustrating a method of recommending a user-specific word as an automatic completion word using an N-gram algorithm.

Referring to FIG. 4B, when the same words are input in the same order (Meet, you, at, the) as in "Meet you at the" input in FIG. 4A, the electronic device 100 may recommend "Galbijip" that the user previously input after "Meet you at the" as an automatic completion word. That is, in an N-gram method, the automatic completion word to be input may be predicted based on individual words of "Meet", "you", "at", and "the" and an input order of the individual words.

However, in the conventional N-gram method, unlike the neural network-based algorithm, when "See" having a semantic meaning similar to "Meet you at the" is input to a location of "Meet", because only individual words are recognized and analyzed according to the order of "See", "you", and "at", it may not be determined that "See you at" has a similar meaning to "Meet you at". Therefore, "Galbijip" that is the user-specific word may not be provided as a recommendation word to the electronic device 100 as the automatic input word after "See you at".

Also, for another example, when text "Go to" is input to the electronic device 100, because the N-gram method does not determine semantic meaning of "Go to" but determines an input order of "Go" and "to" and individual words, there is no similarity in the meaning of the words (play, picnic, school, there) recommended as the automatic completion word. Also, the electronic device 100 may not predict and recommend "Galbijip" that is the user-specific word as the automatic input word to be input after "Go to".

That is, unlike the semantic word embedding method described above with reference to FIG. 3, as shown in FIG. 4B, it may be seen that there is no similarity in the meaning of the recommended words in the N-gram method. In the N-gram method, when "Meet you at", "See you at", or "Go to" is input, a word included in a concept category having a similar meaning based on semantic meaning of the input text is not recommended as the automatic completion word.

Figure 5A:
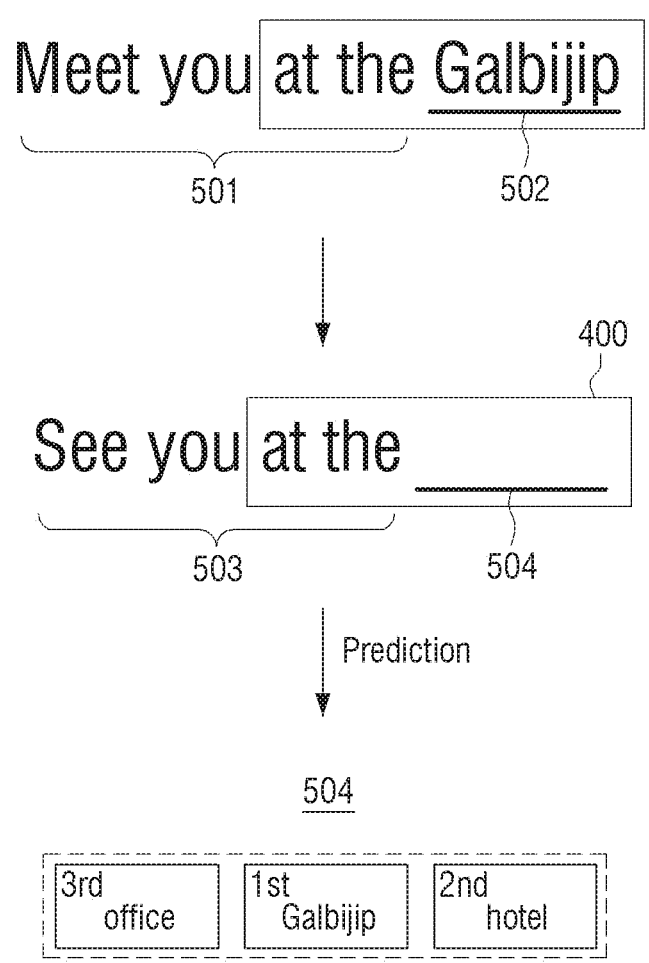
FIGS. 5A and 5B are diagrams illustrating a method of recommending a user-specific word as an automatic completion word to be input in a neural network, according to an embodiment of the disclosure.
Figure 5B:
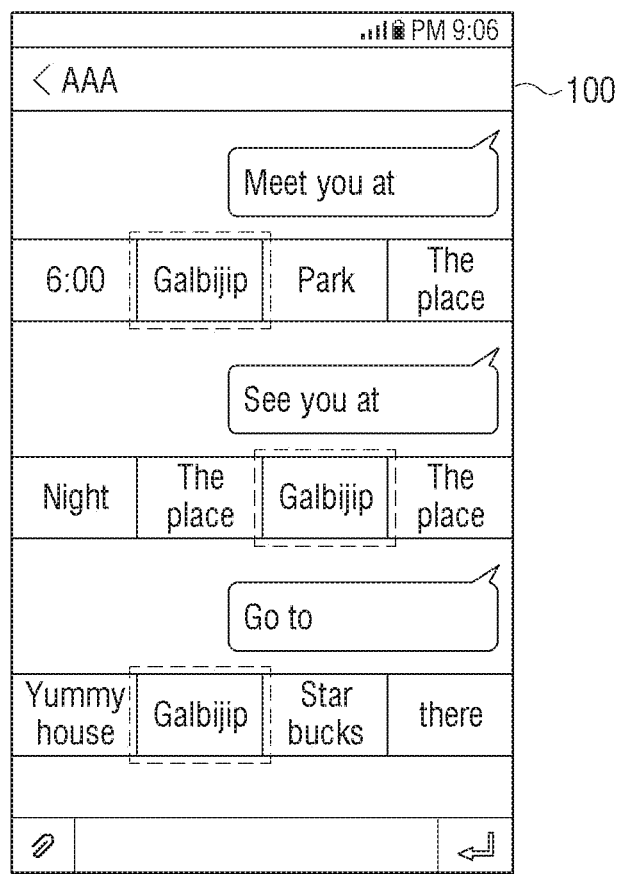

FIGS. 5A and 5B are diagrams illustrating a method of recommending a user-specific word as an automatic completion word to be input in a neural network, according to an embodiment of the disclosure.

FIG. 5A is a diagram illustrating a method of predicting the user-specific word as the automatic completion word in the neural network, according to an embodiment of the disclosure.

Referring to FIG. 5A, as described with reference to FIG. 4A, the electronic device 100 may input "Galbijip" 502 that is the user-specific word which is not one of automatic completion words predicted and recommended in the neural network after a text 501 configured as a word learned in the neural network.

According to an embodiment of the disclosure, when "See you at" 503 that is a text having a similar meaning to "Meet you at the" 501 is input to the electronic device 100 by a neural network language model, the electronic device 100 may predict and provide a word 504 to be input after "at the" in "at the _" 400 as the automatic completion word.

Also, the electronic device 100 may determine that semantic meaning of "See you at" 503 is similar to "Meet you at the" 501 and provide "Galbijip" that is the user-specific word as the automatic completion word to be input after "See you at the" 503 along with "hotel" and "office" that are recommended from the neural network-based language model.

That is, according to an embodiment of the disclosure, the electronic device 100 may determine that a concept category of the user unique word (Galbijip) is the same as a concept category of "hotel" and "office". For example, the electronic device 100 may determine "Galbijip" as a word included in a concept category "place" based on semantic meaning of a sentence input by a user. Therefore, "Galbijip" may be predicted and recommended as the automatic completion word along with "hotel" and "office" included in the place concept category provided in the neural network language model.

FIG. 5B is a diagram illustrating recommending and providing the user-specific word as the automatic completion word when a text having a similar meaning is input to the electronic device 100, according to an embodiment of the disclosure.

Referring to FIG. 5B, when a text corresponding to semantic information of at least one word learned by the neural network language models is input, the electronic device 100 may provide the user-specific word along with at least one word recommended from the neural network-based language model as the automatic completion recommendation word that may be input after the text.

For example, when "Meet you at" shown in FIG. 5A is re-input to the electronic device 100 as shown in FIG. 5B, the electronic device 100 may provide "6:00", "Galbijip", "Park", and "The place" which are automatic completion recommendation words which mean "place" or "time" that may be input next based on semantic information of "Meet you at".

For another example, when "See you at the" is input to the electronic device 100, then the electronic device 100 may provide "Night", "The place", "Galbijip", and "Park" which are automatic completion recommendation words which mean "place" or "time" that may be input next based on semantic information of "See you at the".

For another example, when "Go to" is input to the electronic device 100, the electronic device 100 may provide "Yummy house", "Galbijip", "Starbucks", and "there" which are automatic completion recommendation words which mean "place" that may be input next based on semantic information of "Go to".

In the above-described embodiments, "Galbijip" may be the user-specific word stored in a concept category "place" in a user-based language model in operation of FIG. 5A and may be a word included in a high rank having a specified priority as a recommended word.

As described above, the electronic device 100 may provide an upper number of words having specified priority as the automatic completion recommendation word. In FIG. 5B, four recommended units are provided, but this is merely an embodiment is not limited thereto. Also, a GUI (Graphic User Interface) providing a recommendation word may be implemented and modified in various ways.

Figure 6:
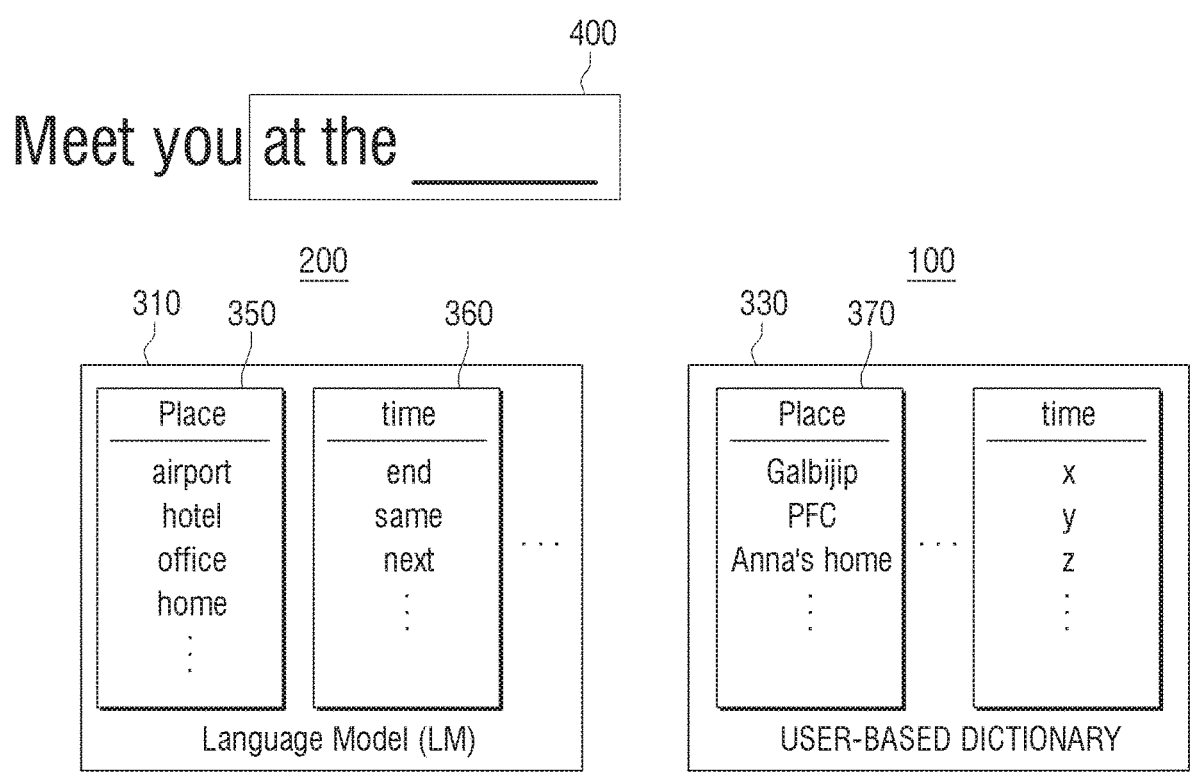
FIG. 6 is a diagram for describing a concept category of a user-specific word stored in a user-based dictionary, according to an embodiment of the disclosure.

FIG. 6 is a diagram for describing a concept category of a user-based dictionary, according to an embodiment of the disclosure.

The electronic device 100 may receive a sentence including a user specific word and at least one word learned by a neural network-based language model 310 of the server 200 from a user.

For example, the sentence may variously include "Meet you at the Galbijip", "See you at the PFC", and "Go to Anna's home", etc.

The electronic device 100 may determine the concept category of the user-specific word based on semantic information of at least one word learned by the neural network language models.

For example, "Meet you at the", "See you at the", and "Go to" may be texts including words learned by the neural network language model (English) 310. A word to be input after "at the" in "at the _" 400 of "Meet you at the" by a neural network semantic word embedding algorithm may include words that mean a place 350 (e.g., airport, hotel, office, home, etc.).

Also, the word to be input after "at the" in "at the _" 400 may include words (e.g., end, same, next, etc.) that mean a time 360.

Thus, the electronic device 100 may categorize and store concept categories of "Galbijip", "PFC", and "Anna's home" as "place" in the user-based dictionary 330, and update the user-based dictionary 330, based on the concept category (place, time) of at least one words 350, 360 learned by the neural network language model 310.

For example, when a cosine similarity of specific words such as "Galbijip", "PFC", "Anna's home" and the like input by the user to the electronic device 100 and the words 350 included in the place category of the neural network language model 310 of the server 200 is high, the concept categories of "Galbijip", "PFC", and "Anna's home" may be categorized into the category "place" and stored in the user-based dictionary 330 of the electronic device 100.

For another example, when a cosine similarity of "PFC" and the words 360 included in a time category among words include in the neural network language model 310 of the server 200 is high, the user-specific word "PFC may be added and updated in the time category of the user-based dictionary 330 of the electronic device 100.

The above-described example is only an embodiment for explaining the disclosure, and is not limited thereto and may be implemented by various words included in various concept categories.

Figure 7:
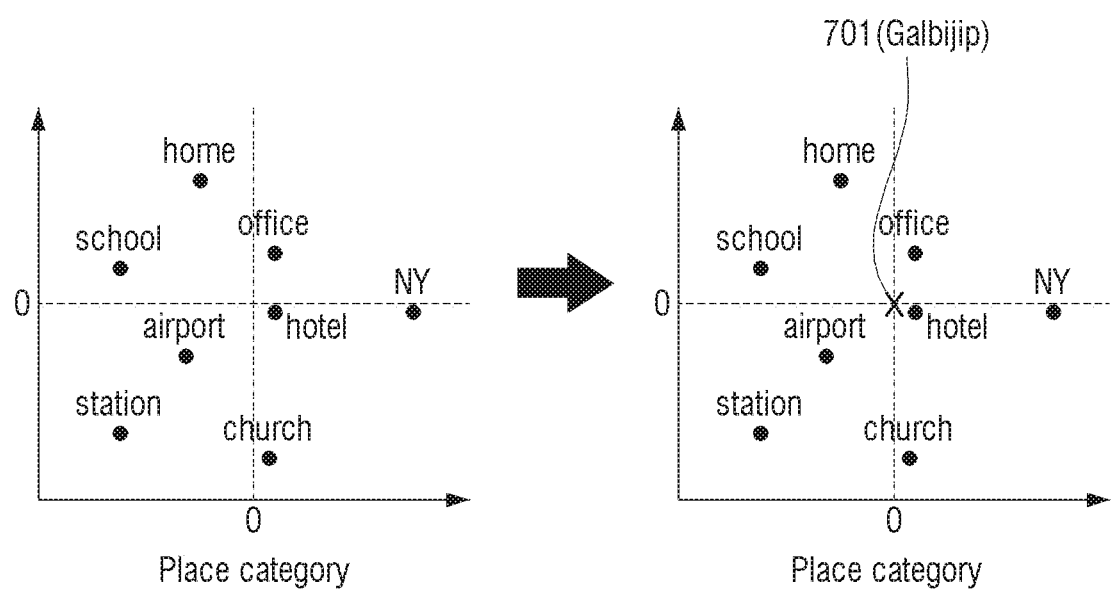
FIG. 7 is a diagram for describing a method of determining a concept category of a user-specific word on a space vector of a neural network language model, according to an embodiment of the disclosure.

FIG. 7 is a diagram for describing a method of determining a concept category of a user-based language model, according to an embodiment of the disclosure.

Words included in a neural network language model may have respective space vector values. Referring to a diagram on the left side of FIG. 7, it may be seen that the words stored on a place concept category space in the neural network language model have respective position vectors.

As the cosine similarity of each word on a vector space is closer to a value of "0", it may be determined that meaning is similar in a neural network method.

For example, in the diagram on the left side of FIG. 7, hotel, airport, and office are closest words to "0". Therefore, as shown in FIG. 4A, in a conventional neural network system, "airport", "hotel", and "office" having high priority in a place category may be predicted as automatic completion recommendation words that may be input after "Meet you at the".

According to an embodiment of the disclosure, the electronic device 100 may project a user-specific word into the concept category space vector of words stored in the neural network language model recommended as an automatic completion word described in FIGS. 5A and 5B. The electronic device 100 may transmit the user-specific word to the neural network as an input value to project the user-specific word to the space vector of the neural network based language model corresponding to the concept category including the user-specific word Thus, as shown in a diagram on the right side of FIG. 7, a user-specific word 701 and at least one words recommended as an automatic completion word in the neural network language model may be located in a vector corresponding to each on the same space vector.

For example, a vector of the user-specific word 701 may be located at a position where a cosine similarity value is the value of "0" on a "place" concept category space vector. That is, "Galbijip" 701 may be a word having semantically highest similarity to meaning of a learned sentence among the place concept categories as a word to be input after the sentence such as "Meet you at", "See you at" and the like that are examples in FIGS. 5A and 5B and are input to the electronic device 100. Also, it may be seen that after "Galijip" 701, a cosine similarity of hotel is close to 0, and after the hotel, a cosine similarity of office is close to 0. Therefore, as shown in FIG. 5A, "Galbijip", "hotel", and "office" having high priority may be provided as automatic input recommendation words to be input after "See you at the".

Also, the electronic device 100 may determine a cosine similarity between a vector of the user-specific word and a vector of at least one word recommended as an automatic completion word to be input from the neural network-based language model, and when the determined cosine similarity is greater than or equal to a specified value, may determine a concept category including the recommended at least one word as the concept category of the user-specific word.

For example, when "PCF" that is a user-specific word is projected simultaneously to the "place" concept category and the "time" concept category of the neural network language model, then a cosine similarity between vector of words learned by the neural network language model located in the "place" concept category and a vector "PCF" and a cosine similarity between vector of words learned by the neural network language model located in the "time" concept category and the vector "PCF" may have different values.

At this time, the concept category having a cosine similarity closer to "0" may be determined as the concept category of "PCF". Thus, the electronic device 100 may add the user-specific word to the determined concept category of the user-specific word and store the user-specific word in a user-based dictionary.

Figure 8:
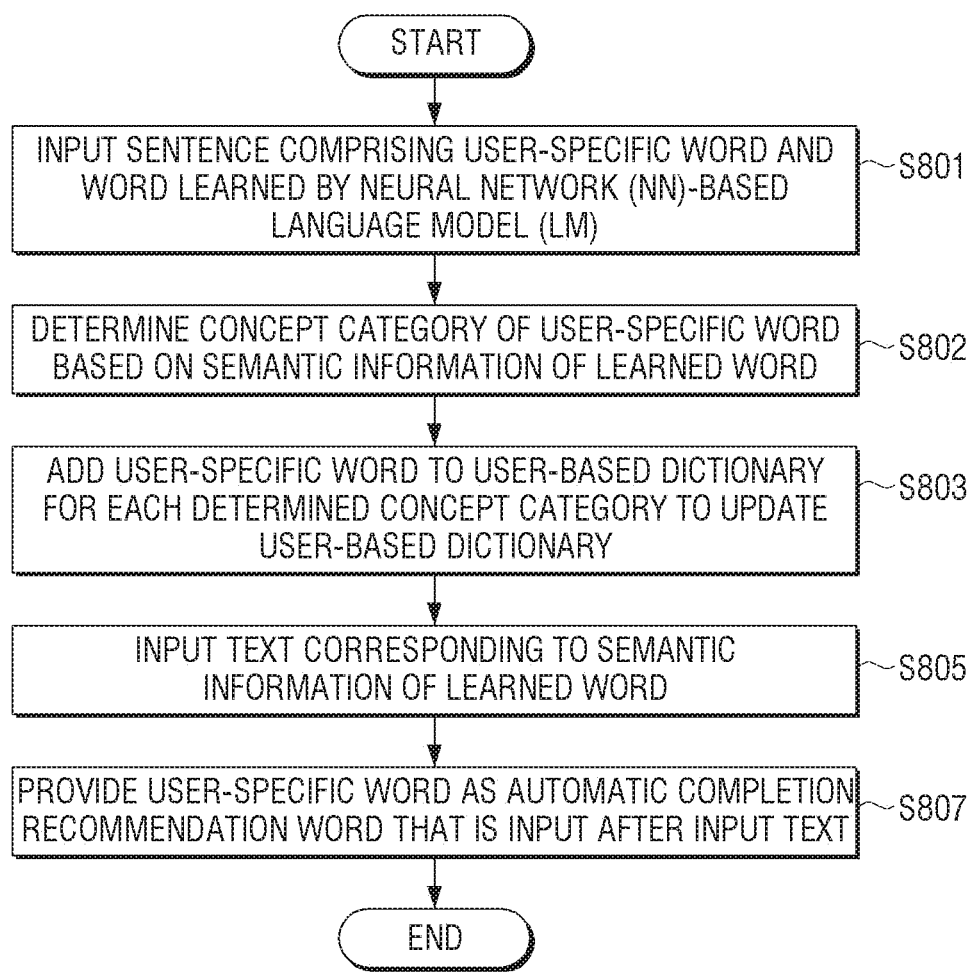
FIG. 8 is a flowchart illustrating a method of providing a user-based language model, according to an embodiment of the disclosure.

FIG. 8 is a flowchart illustrating a method of providing a user-based language model, according to an embodiment of the disclosure.

In step S801, the electronic device 100 may receive a sentence including a user-specific word and a word learned by a neural network (NN)-based language model (LM).

In step S802, the electronic device 100 may determine a concept category of the user-specific word based on semantic information of the word learned in the NN-based LM. A method of determining the concept category is described above in detail in the disclosure and is therefore omitted here.

In step S803, the electronic device 100 may update a user-based dictionary by adding the user-specific word to the user-based dictionary for each determined concept category.

Thus, according to the embodiment described above, the electronic device 100 may provide the user-based dictionary that is frequently used in a user terminal.

In step S805, a text corresponding to the semantic information of the word learned by the NN-based LM may be input to the electronic device 100 by a user.

In step S807, the electronic device 100 may provide the user-specific word from the user-based dictionary as an automatic completion recommendation word that may be input after the input text based on semantic meaning of the input text.

Also, according to an embodiment of the disclosure, the electronic device 100 may receive a request for user-based dictionary information from another terminal device. The electronic device 100 may provide the user-based dictionary information to the other terminal device.

For example, the electronic device 100 may be a smart phone and the other terminal device may be a smart television. The user may input a text on a screen of the smart television using a virtual keyboard of the smartphone. At this time, the smart television may request user-based dictionary information of the smartphone from the smartphone.

According to an embodiment of the disclosure, the electronic device 100 may provide a user-based language model when the other terminal device is authenticated from the electronic device 100.

For example, when a smartphone 100 authenticates data sharing for the smart television, the smartphone 100 may provide the smart television with user-based dictionary information corresponding to the smartphone 100.

Accordingly, even if the user-specific word is not input to the smart television, based on meaning information of a sentence input to the smart television, the user-specific word included in the user-based dictionary corresponding to the smartphone 100 may be provided to the smart television as the automatic completion recommendation word.

Alternatively, the electronic device 100 may provide the user-based dictionary information of the electronic device 100 as a text information file of a small size to the other terminal device in response to a request of the other terminal device. For example, the electronic device 100 may generate the user-based dictionary as a personalization dictionary and store the user-based dictionary in the electronic device 100.

According to an embodiment of the disclosure, the electronic device 100 may delete the user-specific word from the user-based language model when a frequency of use of the user-specific word stored in the user-based dictionary is less than or equal to a specified number of times during a specified period of time. At this time, the specified period and the specified number of times may be variously implemented. As a result, the memory capacity of the electronic device 100 may be efficiently secured.

Figure 9:
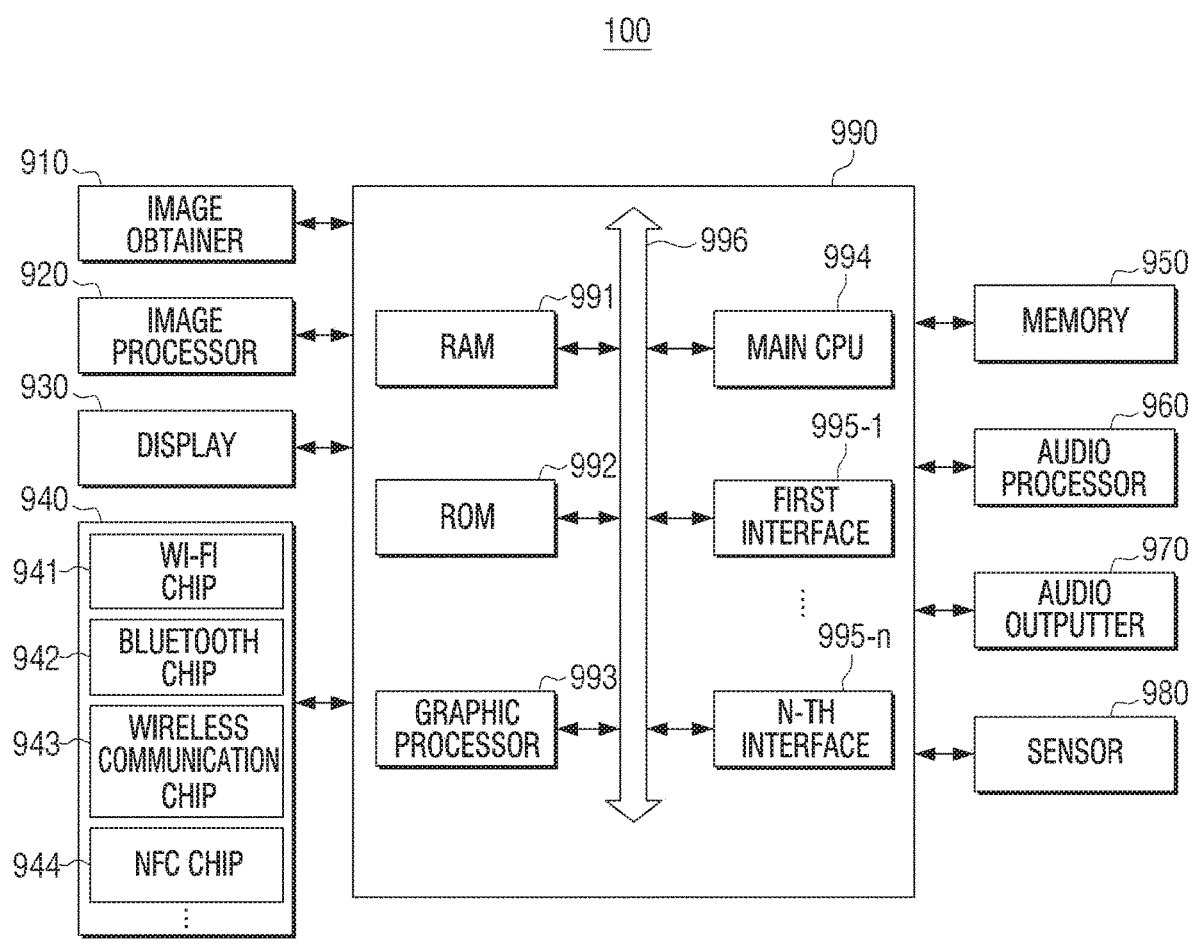
FIG. 9 is a detailed block diagram of an electronic device, according to an embodiment of the disclosure.

FIG. 9 is a detailed block diagram of the electronic device 100, according to an embodiment of the disclosure.

As shown in FIG. 9, the electronic device 100 may include at least one of an image obtainer 910, an image processor 920, a display 930, a communicator 940, a memory 950, an audio processor 960, an audio outputter 970, a sensor 980, and a processor 990. On the other hand, the structure of the electronic device 100 shown in FIG. 9 is merely an example, and is not necessarily limited to the above-described block diagram.

According to an embodiment, some of components shown in FIG. 9 may be omitted or changed, and other components may be further added.

The memory 950 may include various program modules for driving the electronic device 100, but it is appreciated that some of various program modules may be omitted, modified or added, according to a type and a characteristic of the electronic device 100.

The memory 950 may include an internal memory or an external memory. The internal memory may include at least one of a volatile memory or a non-volatile memory. The volatile memory may include, for example, dynamic random access memory (DRAM), static random access memory (SRAM), synchronous dynamic random access memory (SDRAM), or the like. The non-volatile memory may include, for example, one time programmable ROM (OT-PROM), programmable ROM (PROM), erasable and programmable ROM (EPROM), electrically erasable and programmable ROM (EEPROM), mask ROM, flash ROM, NAN flash memory, NOR flash memory, etc. Also, the internal memory may be a solid state drive (SSD).

The external memory may include a flash drive, a compact flash (CF), a secure digital (SD), a micro secure digital (micro-SD), a mini secure digital (mini-SD), an extreme digital (xD), or a memory stick. The external memory may be functionally coupled to the electronic device 100 via various interfaces. Also, the electronic device 100 may further include a storage device such as a hard drive.

The image obtainer 910 may obtain image data through various sources. For example, the image obtainer 910 may receive image data from an external server, and may receive image data from a device located outside the electronic device 100.

Alternatively, the image obtainer 910 may obtain image data by capturing an external environment. For example, the image obtainer 910 may be implemented as a camera that captures the external environment of the electronic device 100. The image data obtained through the image obtainer 910 may be processed in the image processor 920.

The image processor 920 is a component that performs processing on the image data received by the image obtainer 910. The image processor 920 may perform various types of image processing such as decoding, scaling, noise filtering, frame rate conversion, resolution conversion, etc. on the image data.

The display 930 may include a touch screen or a flexible screen.

The communicator 940 is a component that performs communication with various types of external devices according to various types of communication methods. The communicator 940 may include at least one of a Wi-Fi chip 941, a Bluetooth chip 942, a wireless communication chip 943, and an NFC chip 944. The processor 990 may communicate with an external server or various external devices using the communicator 940.

In particular, each of the Wi-Fi chip 941 and the Bluetooth chip 942 may perform communication using a WiFi method or a Bluetooth method. When the WiFi chip 941 or the Bluetooth chip 942 is used, various types of connection information such as an SSID, a session key, etc. may be firstly transmitted and received, and may be used to transmit and receive various types of information.

The wireless communication chip 943 refers to a chip that performs communication according to various communication standards such as IEEE, Zigbee, 3G (3rd Generation), 3GPP (3rd Generation Partnership Project), LTE (Long Term Evolution), etc. The NFC chip 944 refers to a chip that operates through an NFC (Near Field Communication) method using a 13.56 MHz band among various RF-ID frequency bands such as 135 kHz, 13.56 MHz, 433 MHz, 860 to 960 MHz, 2.45 GHz, etc.

The memory 950 may be implemented as a non-volatile memory, a volatile memory, a flash memory, a hard disk drive (HDD), or a solid state drive (SSD). The memory 950 may be accessed by the processor 990 and read/write/modify/delete/update of data, etc. may be performed by the processor 990. The term memory in the disclosure may include the memory 950, a ROM 992 in the processor 990, a RAM 991 or a memory card (not shown) (e.g. micro SD card and memory stick) mounted in the electronic device 100.

Also, the memory 950 may store programs and data for configuring various screens to be displayed on a display region of the display 930.

The audio processor 960 is a component that performs processing on audio data of image content. The audio processor 960 may perform various types of processing such as decoding and amplification, noise filtering, and the like on the audio data. The audio data processed by the audio processor 960 may be output to the audio outputter 970.

In particular, the audio outputter 970 may be implemented as a speaker, but this is merely an embodiment, and the audio outputter 970 may be implemented as an output terminal capable of outputting the audio data.

The sensor 980 may include a plurality of sensors capable of sensing various user interactions. The sensor 980 may include various sensors such as a motion sensor, a gyroscope sensor, an acceleration sensor, a barometer, a thermal sensor, a humidity sensor, an ultrasonic sensor, etc. The above-described examples are merely an embodiment, but are not limited thereto.

That is, the sensor 980 may sense a state change based on the electronic device 100, generate a corresponding sensing signal, and transmit the sensing signal to the processor 990.

A microphone (not shown) may receive a user voice for controlling at least one of the electronic device 100 and another terminal device through the electronic device 100, and recognize the user voice through a speech recognition module. Then, the microphone may transmit a result of recognition to the processor 990. At this time, the speech recognition module may be located on a part of the processor 990, or at the outside of the electronic device 100, rather than on the microphone.

The processor 990 (or a processor) may use the various programs stored in the memory 950 to control the overall operation of the electronic device 100.

The processor 990 may include the RAM 991, the ROM 992, a graphic processor 993, a main CPU 994, first through n-th interfaces 995-1 through 995-n, and a bus 996. At this time, the RAM 991, the ROM 992, the graphic processor 993, the main CPU 994, the first through n-th interfaces 995-1 through 995-n, etc. may be connected to each other via the bus 996.

The RAM 991 stores an O/S and an application program. Specifically, when the electronic device 100 is booted, the O/S may be stored in the RAM 991, and various application data selected by a user may be stored in the RAM 991.

The ROM 992 stores a command set for booting the system and the like. When a turn-on command is input and power is supplied, the main CPU 994 copies the O/S stored in the memory 950 to the RAM 991 according to the instruction stored in the ROM 992, executes O/S, and boots the system. When booting is completed, the main CPU 994 copies various application programs stored in the memory 950 to the RAM 991, executes the application program copied to the RAM 991, and performs various operations.

The graphic processor 993 generates a screen including various objects such as items, images, text, and the like.

The main CPU 994 accesses the memory 950 and performs booting using the O/S stored in the memory 950. The main CPU 994 performs various operations using various programs, content, data, etc. stored in the memory 950.

The first through n-th interfaces 995-1 through 995-n are connected to the various components described above. One of the first to n-th interfaces 995-1 to 995-n may be a network interface connected to an external device over a network.

The device (e.g., modules or the electronic device 100) or the method (e.g., operations) according to various embodiments may be performed by at least one computer (e.g. the processor 990) that executes instructions included in at least one of programs maintained in computer-readable storage media.

The program may be stored on a computer-readable storage medium such as a hard disk, a floppy disk, magnetic media (e.g. magnetic tape), optical media (e.g. compact disc read only memory (CD-ROM), digital versatile disc (DVD), magneto-optical media (e.g., floptical disk), a hardware device (e.g., read only memory (ROM), random access memory (RAM) or etc.

The storage medium is generally included as part of the structure of the electronic device 100 but may be mounted through a port of the electronic device 100 or may be included in an external device (e.g., a cloud, a server or other electronic device) located outside the electronic device 100. Also, the program may be stored in a plurality of storage media. At this time, at least a part of the plurality of storage media may be located in the external device of the electronic device 100.

Although the embodiments of the disclosure have been illustrated and described, the disclosure is not limited to the abovementioned specific embodiments, but may be variously modified by those skilled in the art to which the disclosure pertains without departing from the spirit and scope of the disclosure as claimed in the claims. In addition, such modifications should also be understood to fall within the scope of the disclosure.

The invention claimed is:

1. An electronic device for supporting a personalization service, the electronic device comprising:
   a storage storing a user-based dictionary;
   an input circuitry receiving an input of a sentence comprising a user-specific word and at least one word learned by a neural network-based language model; and
   a processor configured to:
      identify a concept category of the user-specific word based on semantic information of the input sentence when the user-specific word is not included in the neural network-based language model,
      add the user-specific word to the user-based dictionary to update the user-based dictionary,
      control the input circuitry to input a text, and
      provide the user-specific word as an automatic completion recommendation word that is input after the text when the text corresponding to the semantic information of the at least one learned word is input,
   wherein the processor is further configured to project the user-specific word onto a space vector of the neural network-based language model corresponding to the identified concept category,
   wherein the space vector is a concept category space in which a recommended at least one word is located, and
   wherein the processor is further configured to:
      identify a cosine similarity between a vector of the user-specific word and a vector of the recommended at least one word, and
      when the identified similarity is greater than or equal to a specified value, identify a concept category comprising the recommended at least one word as a concept category of the user-specific word.

2. The electronic device as claimed in claim 1, wherein the processor is further configured to provide the user-specific word along with at least one word recommended from the neural network-based language model as the automatic completion recommendation word that is input after the text.

3. The electronic device as claimed in claim 2, wherein the processor is further configured to provide an upper number of words having specified priority as the automatic completion recommendation word.

4. The electronic device as claimed in claim 3, wherein the processor is further configured to provide the user-specific word as the automatic completion recommendation word when a priority of the user-specific word is included in the provided upper priority number of words having specified based on the identified similarity.

5. The electronic device as claimed in claim 1, further comprising:
   a communication circuitry configured to perform communication with an external device,
   wherein the processor is further configured to provide user-based dictionary information to another terminal device in response to a signal requesting the user-based dictionary information from the other terminal device by the communicator.

6. The electronic device as claimed in claim 5, wherein the processor is further configured to provide the user-based dictionary information to the other terminal device authenticated from the electronic device.

7. The electronic device as claimed in claim 1, wherein the processor is further configured to delete the user-specific word from the user-based dictionary when a frequency of use of the user-specific word is less than or equal to a specified number of times during a specified period of time.

8. A control method for supporting a personalization service of an electronic device, the control method comprising:
   receiving an input of a sentence comprising a user-specific word and at least one word learned by a neural network-based language model;
   identifying a concept category of a user-specific word based on semantic information of the input sentence;
   adding the user-specific word to a user-based dictionary to update the user-based dictionary; and
   providing the user-specific word as an automatic completion recommendation word that is input after a text when the text corresponding to the semantic information of the at least one learned word is input,
   wherein the updating further comprises projecting the user-specific word onto a space vector of the neural network-based language model corresponding to the identified concept category,
   wherein the space vector is a concept category space in which a recommended at least one word is located, and
   wherein the updating further comprises:

identifying a cosine similarity between a vector of the user-specific word and a vector of the recommended at least one word; and when the identified similarity is greater than or equal to a specified value, identifying a concept category comprising the recommended at least one word as a concept category of the user-specific word.

9. The control method as claimed in claim 8, wherein the providing further comprises providing the user-specific word along with at least one word recommended from the neural network-based language model as the automatic completion recommendation word that is input after the text.

10. The control method as claimed in claim 9, wherein the providing further comprises providing an upper number of words having specified priority as the automatic completion recommendation word.

11. The control method as claimed in claim 10, wherein the providing comprises providing the user-specific word as the automatic completion recommendation word when a priority of the user-specific word is included in the provided upper number of words having specified priority based on the identified similarity.

12. The control method as claimed in claim 8, further comprising:

receiving a request for the user-based dictionary from an external electronic device; and providing the user-based dictionary to the external electronic device as a file.

\* \* \* \* \*